US011687997B2

(12) United States Patent
Girish et al.

(10) Patent No.: US 11,687,997 B2
(45) Date of Patent: Jun. 27, 2023

(54) BROWSER EXTENSION FOR CLIENT-SIDE TOKENIZED AUTHENTICATION

(71) Applicant: VISA INTERNATIONAL SERVICE ASSOCIATION, San Francisco, CA (US)

(72) Inventors: Aparna Girish, Foster City, CA (US); Parveen Bansal, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 110 days.

(21) Appl. No.: 16/481,106

(22) PCT Filed: Jan. 26, 2018

(86) PCT No.: PCT/US2018/015604
§ 371 (c)(1),
(2) Date: Jul. 26, 2019

(87) PCT Pub. No.: WO2018/140828
PCT Pub. Date: Aug. 2, 2018

(65) Prior Publication Data
US 2019/0340679 A1 Nov. 7, 2019

Related U.S. Application Data

(60) Provisional application No. 62/451,664, filed on Jan. 28, 2017, provisional application No. 62/451,638, filed on Jan. 27, 2017.

(51) Int. Cl.
*G06Q 30/00* (2023.01)
*G06Q 30/0601* (2023.01)
(Continued)

(52) U.S. Cl.
CPC ......... *G06Q 30/0643* (2013.01); *G06F 3/167* (2013.01); *G06Q 20/12* (2013.01); *G06Q 20/3674* (2013.01)

(58) Field of Classification Search
CPC .............. G06Q 30/0643; G06Q 20/12; G06Q 20/3674; G06F 3/167
See application file for complete search history.

(56) References Cited

U.S. PATENT DOCUMENTS 7,668,821 B1 * 2/2010 Donsbach ........... G06F 16/9535
707/765
9,195,984 B1 * 11/2015 Spector ................ G06Q 20/322
(Continued)

FOREIGN PATENT DOCUMENTS

CN 103617531 3/2014
CN 103635920 A 3/2014
(Continued)

OTHER PUBLICATIONS

"Pinterest Announces New Shopping-Focused Features," by Mike Isaac, New York Times Company, Jun. 28, 2016 (Year: 2016).*
(Continued)

*Primary Examiner* — Anne M Georgalas
(74) *Attorney, Agent, or Firm* — K&L Gates LLP

(57) ABSTRACT

A direct payment token generation method provides executable codes to a client device. The executable codes invokes functionalities in a browser application. The set of executable codes further provides login prompts to the user for logging to a virtual wallet account. The method provides a list of products for purchase from merchants in response to a successful login to the virtual wallet account. A graphical element is provided for purchasing one provided product from one of the merchants. In response to receiving a selection of the provided graphical element confirming the purchase, a payment token is generated for the virtual wallet account. The received selection includes confirming detailed information of the purchase. The payment token is transmitted to the client device and is embedded in a payment (Continued)

payload with the detailed information of the purchase. The payment load is transmitted to the one of the merchants to complete the purchase.

20 Claims, 14 Drawing Sheets

(51) Int. Cl.
*G06F 3/16* (2006.01)
*G06Q 20/12* (2012.01)
*G06Q 20/36* (2012.01)

(56) References Cited

U.S. PATENT DOCUMENTS

| | | | |
|---|---|---|---|
| 10,762,496 B2* | 9/2020 | Butler, IV | G06Q 20/367 |
| 10,878,477 B2* | 12/2020 | Narasimhan | G06Q 30/0243 |
| 2007/0118434 A1* | 5/2007 | Mengerink | G06Q 30/0613 |
| | | | 705/26.41 |
| 2009/0171810 A1* | 7/2009 | Mengerink | G06Q 20/40 |
| | | | 705/26.1 |
| 2009/0177587 A1* | 7/2009 | Siegal | G06Q 20/10 |
| | | | 705/67 |
| 2011/0029400 A1* | 2/2011 | Scipioni | G06Q 20/3263 |
| | | | 705/40 |
| 2012/0316992 A1* | 12/2012 | Oborne | G06Q 20/386 |
| | | | 705/26.41 |
| 2014/0052617 A1 | 2/2014 | Chawla | |
| 2014/0129435 A1 | 5/2014 | Pardo | |
| 2015/0161597 A1* | 6/2015 | Subramanian | G06Q 20/204 |
| | | | 705/41 |
| 2016/0055563 A1* | 2/2016 | Grandhi | G06Q 30/0625 |
| | | | 705/26.62 |
| 2016/0132868 A1 | 5/2016 | Butcher | |
| 2016/0210626 A1* | 7/2016 | Ortiz | G06Q 20/12 |
| 2017/0180343 A1* | 6/2017 | de Ganon | G06Q 20/4014 |
| 2022/0383325 A1* | 12/2022 | Hoffman | G06Q 20/4012 |

FOREIGN PATENT DOCUMENTS

| | | |
|---|---|---|
| CN | 103745352 | 4/2014 |
| CN | 103761644 | 4/2014 |
| CN | 103765453 A | 4/2014 |

OTHER PUBLICATIONS

"Zacks Investment Research: Visa (V) to Buy Cardinal to Boost Security in Online Services," Weblog Post, Newstex Finance & Accounting Blogs, Newstex, Dec. 2, 2016, (Year: 2016).*

"BulaPay: a novel web service based third-party payment system for ecommerce," by Xiaodi Huang, Xiaoling Dai, and Weiqiang Liang, Electronic Commerce Research 14.4: 611-633, Springer Nature B.V. (Dec. 2014) (Year: 2014).*

PCT International Search Report and Written Opinion for PCT/US18/15604, dated Apr. 25, 2018, 11 pages.

English translation of Chinese Office Action issued in App. No. CN20188008532, dated Nov. 29, 2022, 9 pages.

* cited by examiner

[0001] Merchant initializes and renders Visa Flash icon against relevant products. (using v.init for Flash)
[0002] Merchant shares SKU number, Maximum quantities available, Buying Criteria (Size/Width/Length/Age/Color/etc)
[0003] When user clicks on the Visa Flash icon, Visa Checkout intimates merchant through a Visa Checkout/Flash payload. (using Payload for Flash)

FIG. 10

[0001] Merchant initializes and renders Visa Flash icon against relevant products. (using v.init for Flash)
[0002] Merchant shares SKU number, Maximum quantities available, Buying Criteria (Size/Width/Length/Age/Color/etc)
[0003] When user clicks on the Visa Flash icon, Visa Checkout intimates merchant through a Visa Checkout/Flash payload. (using Payload for Flash)

FIG. 11

BROWSER EXTENSION FOR CLIENT-SIDE TOKENIZED AUTHENTICATION

CROSS-REFERENCE TO RELATED APPLICATION

This is an U.S. National Stage of the PCT international patent application of PCT/US18/15604, filed on Jan. 26, 2018, which claims priority to a U.S. provisional patent application, Ser. No. 62/451,638, filed on Jan. 27, 2017 and a U.S. provisional patent application, Ser. No. 62/451,664, filed on Jan. 28, 2017, whose disclosures are incorporated by reference in its entirety herein. The disclosure is also generally related to a commonly-owned U.S. nonprovisional patent application Ser. No. 15/418,552, entitled "ACCEPTING ISSUER CREDENTIALS AT CHECKOUT", filed also on Jan. 27, 2017, which claims priority to an U.S. provisional patent application Ser. No. 62/287,754 filed on Jan. 27, 2016, whose disclosure is incorporated by reference in its entirety herein. This disclosure is further generally related to a commonly-owned U.S. nonprovisional patent application Ser. No. 14/938,530, entitled "BROWSER EXTENSION WITH ADDITIONAL CAPABILITIES", filed on Nov. 11, 2015, whose disclosure is incorporated by reference in its entirety herein.

FIELD OF THE INVENTION

Embodiments of the invention generally relates to systems and methods for generating client-side tokenized authentication via a browser extension.

BACKGROUND

Shopping on the Internet has become such a customary and common part of a user's lifestyle that the user rarely thinks twice about it. The online shopping has also been tracking the existing shopping or purchasing model: the user visits a merchant's website (as if that's the merchant's physical storefront); the user either selects a particular category of goods or services or enters a particular search item to browser through the returned results; the user reviews details about the desirable item or items; adding the items to the shopping cart; and eventually begins the checkout process.

The checkout process typically requires the user either signs into the merchant's secure payment portal or account, creates a new account if no existing account is found, or proceeds as a guest. Once signed in, the merchant typically starts a checkout session with arbitrary or predetermined expiration time for the user to complete the checkout process before the items in the shopping cart is removed or the user is forced to be logged out. During this checkout session, the user may then verify or enter payment information and shipping information, etc., to complete the checkout process.

Because online shopping breaks the physical barriers of the merchant's storefront, if any, the user frequently use the Internet search engines to compare prices or browsing merchant's competitors' sites either simultaneously or in different Internet browser pages. This virtual store-hopping is made especially easy by the Internet. However, this virtual "window shopping" and virtual "store-hopping" could be very time-consuming and repetitive. The problem is because many merchants have required consumers to establish accounts to receive special offers or deals or even showing coupons on the page. As such, the user would be required to enter credentials to log-in to the accounts at various merchant sites. This is a problem because it takes a tremendous amount of time. This problem is further exacerbated by the fact that, during the virtual "window-shopping" or virtual "store-hopping," the checkout session may expire. For those who have created an account, the added items should still be in the shopping cart. However, for those who didn't have an account and used a temporary or guest account before the checkout process, the shopping cart items would likely be removed after the expiration. So the user needs to start over.

The above problem is further translated to the merchants. For example, the above situation with expired session means the merchant's server has provided wasted resources to the user. Also, the merchant has no little or no idea whether the user was virtual window-shopping, comparing competitor's prices or just being distracted by other legitimate reasons. In other words, the abandoned carts or items fail to provide the merchant any definitive or probable explanation. Moreover, the merchant also could not track loyalty of brands in the current shopping behavior.

Of course, some merchants have attempted to become the mega store that carries such a wide range of goods that it is very likely to find almost anything and everything that a majority of users need or want. However, even at the mega store, the problems above relating to checkout session timed-out, repeated logins, account establishments, virtual window-shopping, virtual store-hopping, etc., continue.

Furthermore, after the checkout, the merchant needs to take the user's payment method to pay for the transaction/purchase. The merchant typically needs to build a robust secure transaction channel to ensure the payment method information of the user is protected. For example, the merchant needs to secure the payment methods each time by receiving authentications from payment processors. If the merchant does not wish to spend resources to build such a secure transaction channel, a third party may provide such service. However, this does not alleviate the responsibility of the merchant in securely store user's information in the accounts associated with the merchant.

Therefore, it is desirable to approach online shopping from the perspective of the users and to resolve some of the above problems that are not only convenient but also breaks down the online shopping norm by removing the need to visiting different store sites and repeating the login step. It is also desirable to create a new shopping experience that is secure, both to the user and the payment vehicle issuers (such as banks, etc.).

SUMMARY

In one embodiment, aspects of the invention create a specific browser extension, plug-in or add-on that is conveniently installed on a client device of the user that brings the shopping experience to the user. In one example, the browser extension triggers or drives graphical user interface (GUI) elements that display items of interests from the user's browsing history, calendar notes, to-do lists, reminders, address book, etc. In a further example, the browser extension is integrally connected with a payment processing account sponsored by a payment processor. The payment processing account links at least one payment vehicle (and does not need to be affiliated with the payment processor) such that the user may choose among them at the time of payment. Moreover, once the user wishes to checkout an item, the browser extension defines checkout screens, pages or widgets on the user's browser to begin the checkout process. When the payment is to be transmitted, the payment processor generates a specific payment token via the browser extension to the client device of the user, instead of sending it to the merchant, to authenticate the transaction. Therefore, the user would know the payment method and transaction is securely done.

BRIEF DESCRIPTION OF THE DRAWINGS

The invention may be better understood by reference to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 10 illustrates a flow diagram of one method according to one embodiment of the invention.

FIG. 11 illustrates a flow diagram of another method according to one embodiment of the invention.

Figure 1:
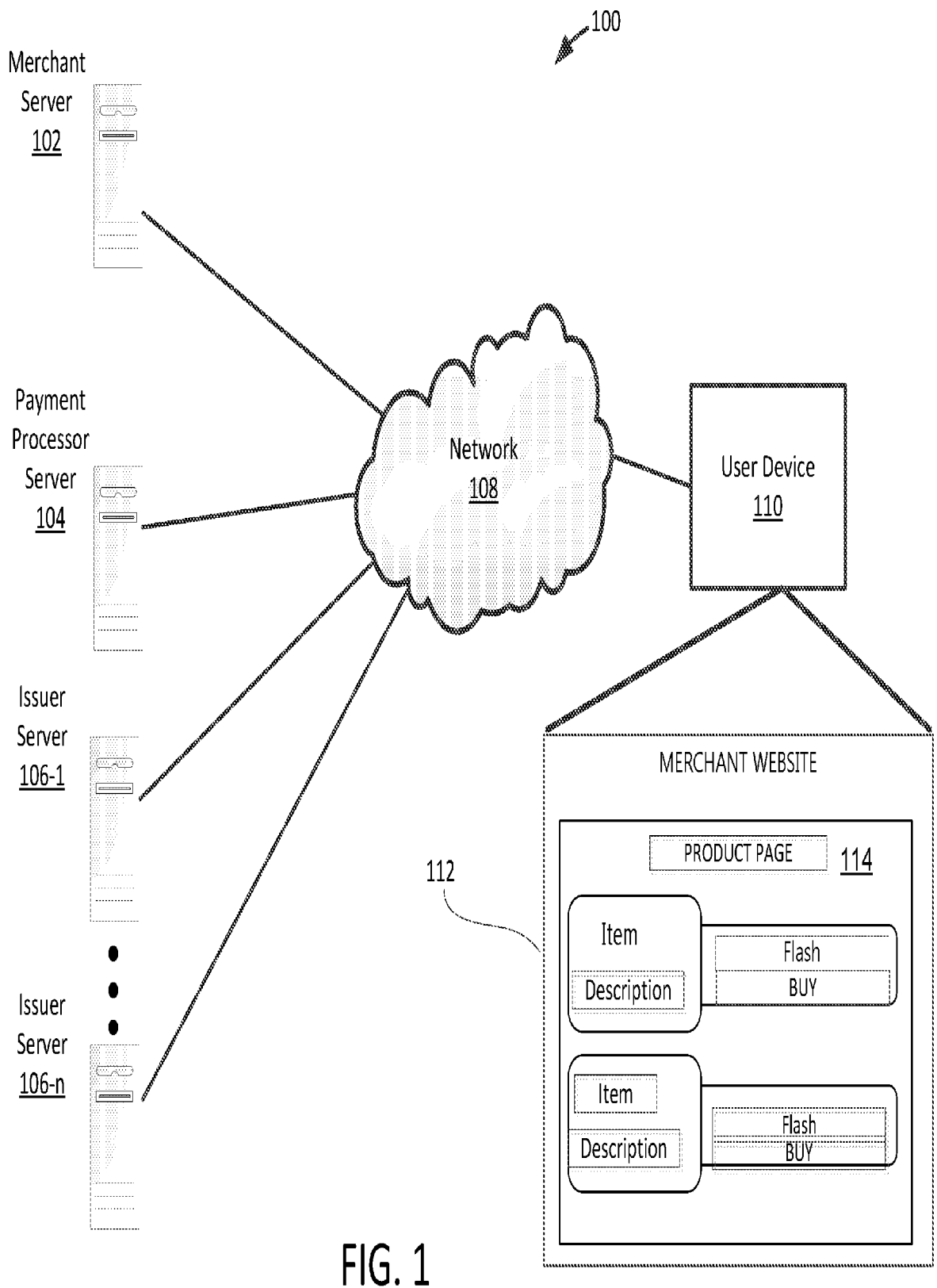
FIG. 1 illustrates a diagram showing one implementation according to one embodiment of the invention.

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

It is to be understood that analysts of all disciplines, either in a scientific field, social science studies, manufacturing, etc., constantly face with plethora of data to identify and process. Part of these analyses is to generate insights out of different datasets. There are many approaches, but one of the approach is to identifying correlations between datasets. In such an attempt, one may perform a join operation of two or more datasets stored in database storage or structures. The "join" operation may be part of database programming and such operation typically includes a syntax and a set of required parameters for a database oriented computer, such as a database server, to execute and generate results. When the datasets are small, the joining operation does not take very long, and the results are typically provided or generated instantaneously. However, as the size of the datasets starts growing exponentially, the join performance suffers significantly. This is because the join operation requires sorting and searching of the relevant data fields in the targeted datasets before producing an output dataset with the joined results.

Referring now to FIG. 1, a block diagram of a system 100 in accordance with exemplary embodiments. System 100 may include a merchant server 102, a payment processor server 104, and at least one issuer server 106 communicatively coupled to one another and at least one user device 110 via one or more computer networks 108 (e.g., local area network, wide area network, wireless network, wired network, and the like, and/or some combination thereof). Issuer servers 106-1-106-n are depicted, where n is a positive integer.

A user device 110 may interact with a merchant server 102 to obtain a merchant's graphical user interface for viewing items (e.g., goods, services, and the like) for sale and making purchases from the merchant. An example of a merchant's graphical user interface (GUI) is a webpage 112. The webpage 112 may further include an individual page 114 displaying one or more items for sale, purchase, rent, or transaction as shown in FIG. 1.

Typically, the merchant may provide on the page 114 the ability for the user to purchase the displayed items. For example, the merchant may show a selectable button or a graphical element that when selected triggers or initiates a checkout process. Instead of the merchant directly collecting payment from the user, the merchant may leverage technology provided by a payment processor and/or an issuer to collect payment when the user selects this "BUY" button.

However, this requires the merchant to ensure the transaction is safe and secured.

Aspects of the invention introduces, in one embodiment, a browser extension, plug-in, add-on or an element that provides a better shopping experience and a quick transaction experience to the user. In one example, the browser extension includes a set of executable codes that is executed within the browser execution environment. In another embodiment, the browser extension may be executable as an operating system function-call that is associated with the operating system of a client device, such as FIG. 13, of the user.

Figure 2:
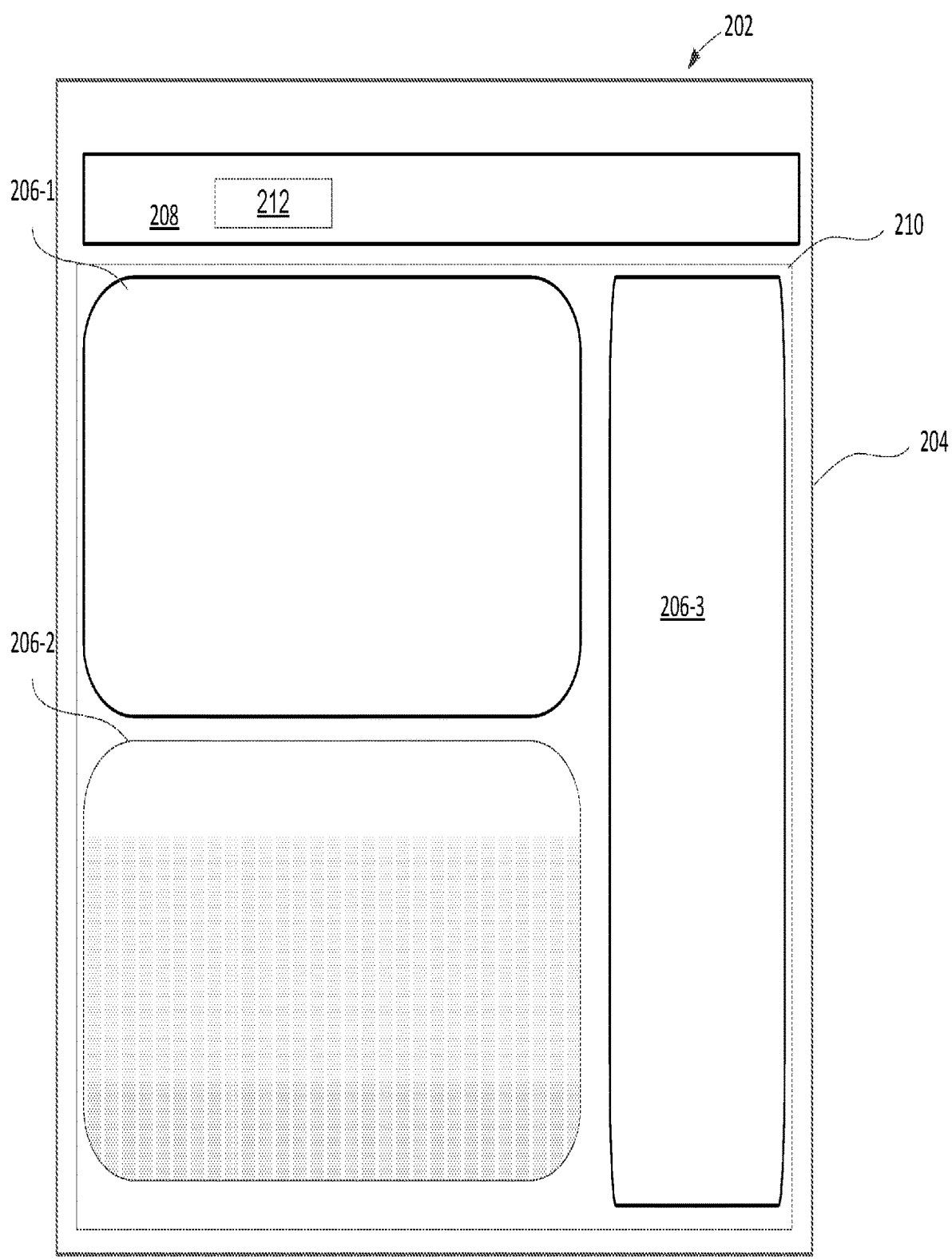
FIG. 2 illustrates a diagram showing an exemplary implementation of a browser extension according to one embodiment of the invention.

To further illustrate the browser extension aspect of embodiments of the invention, referring now to FIG. 2, a block diagram illustrates such an embodiment. For example, a browser application 202 may drive one instance 204 as a graphical user interface of the browser application 202 upon activation or execution. The browser application 202 may provide a toolbar 208, a plurality of display areas or panels where different areas of the graphical user interface require a specific structured graphical user interface element paired with a pre-scribed functionality directly related to the graphical user interface's structure/panels. For example, the panel 206-1 may show the main content of a given webpage. The panel 206-2 may include data fields to show notifications or notes of the user. The panel 206-3 may include further data fields to show browsing history of the user.

Figure 3:
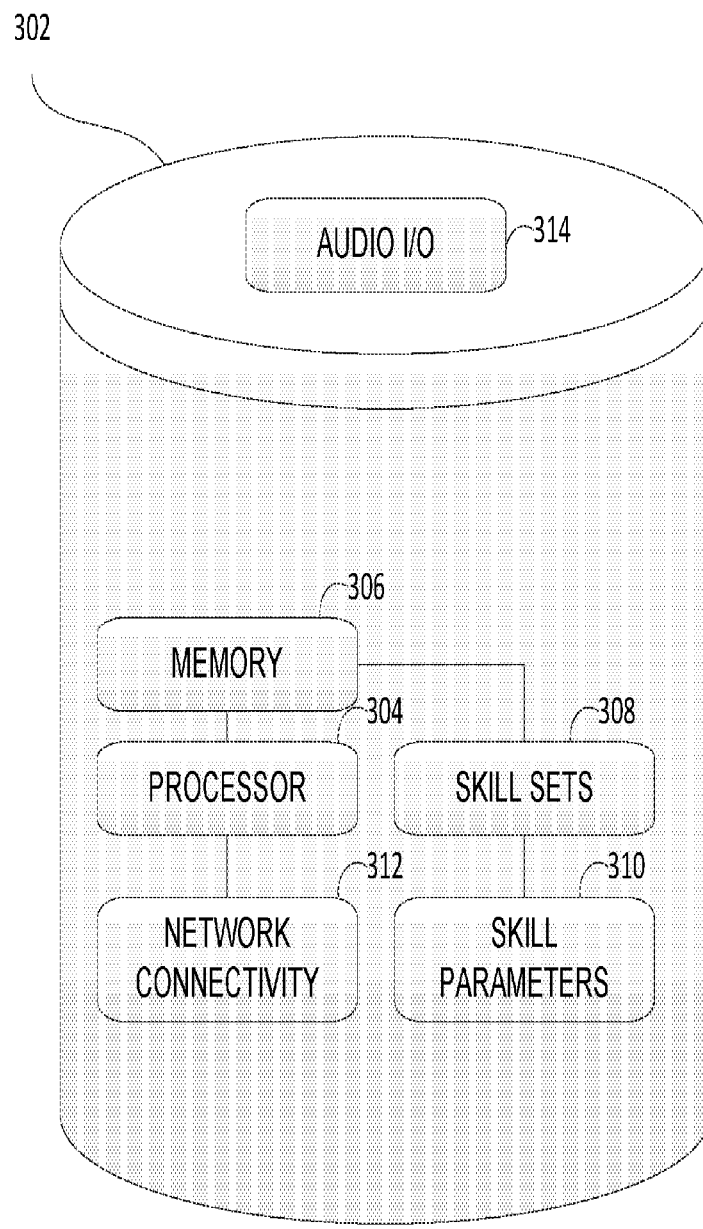
FIG. 3 illustrates a diagram showing a further alternative implementation according to one embodiment of the invention.

In another embodiment, the browser extension may be morphed to non-visual platforms. For example, as shown in FIG. 3, a diagram illustrates a user interactive device 302 that interacts with the user via audio instructions or commands only. The user interactive device includes a processor 304, a memory 306 storing data, a network connectivity device 312, and audio input and output device 314. Aspects of the browser extension may be translated to computer-executable instructions that are defined as different sets of "skill". Such sets may be stored separately in 308 as part of the memory 306. Moreover, parameters needed for the "skill" may be stored in 310 of the memory 306.

To further illustrate examples of the invention, it is to be understood that whether in the form of a browser extension or a "skill" for the user interactive device 302, the functionality of the browser extension or "skill" may need to be loaded or installed onto the client device, whether the client device be a computing device with a visual display (such that browser extension may be added thereto) or an audio only device where no visual display is provided or needed for the device to function, such as the user interactive device 302. For example, the functionality of the browser extension may be downloaded to the computing device via wire or wirelessly. Once it is loaded, the functionality of the browser extension or "skill" is operational and ready for the user to interact.

For the sake of simplicity and convenience and by no means a limitation, the functionality of the browser extension may be referred to as a "Flash," or a "Flash button," for the remainder of the specification.

Referring now to FIGS. 4-9, a series of diagrams showing screen displays according to one embodiment of the invention. In one example, once the Flash button is installed, the Flash button may appear on the browser as a button or a graphical element easily recognizable and accessible on the browser application by the user. See FIG. 4, button 212 on a browser toolbar 402. In the non-visual scenario, the Flash may be ready for execution once a trigger word or a keyword is detected audibly by the user interactive device 302. Next, it may need to be initialized. Such initialization may involve connecting to an account with a payment processor, obtain authorization from the user to access various data of the user on the client device, or the like. For example, in one embodiment, the Flash button may provide access to a virtual wallet account associated with a payment processor. As such, at the initialization stage, upon selecting the Flash button, the user may be prompted to login to the virtual wallet account.

In another embodiment, merchants wishing to be part of the Flash program with the payment processor 104 may associate a merchant-end Flash button with a product, such as one shown on the page 114 in FIG. 1. On the backend, either through web crawlers or application programming interface (API) protocols, merchants provide, feed, or share product SKU number, maximum quantities available, buying criteria (e.g., size, width, length, age, color, etc.,), discounts, coupons, due dates, etc., to the payment processor 104.

It is to be understood that the payment processor 104 may have various databases to process, organize, prioritize, etc., the received data from the different merchants such that the payment processor 104 may present the various products in an organized way.

In one embodiment, upon initialization of the Flash button as a browser extension, the Flash detects whether the user already has an account with the virtual wallet account. In some examples, a user may pre-enroll in a payment processor checkout program to link an account a user has established with an issuer to a virtual wallet account established with the payment processor. An issuer may be a bank that issues a credit or debit card to a user in association with a particular payment processor (e.g., VISA). Merchants may enroll in the virtual wallet program of the payment processor so that customers can simply input an alias and credential, instead of a personal account number (e.g., credit card number), when making purchases online. It is typically simpler for a customer to remember an alias and a credential (e.g., username and password), as compared to a personal account number, thus making it easier for a customer to make an online purchase and more likely that the customer actually completes the purchase.

Figure 4:
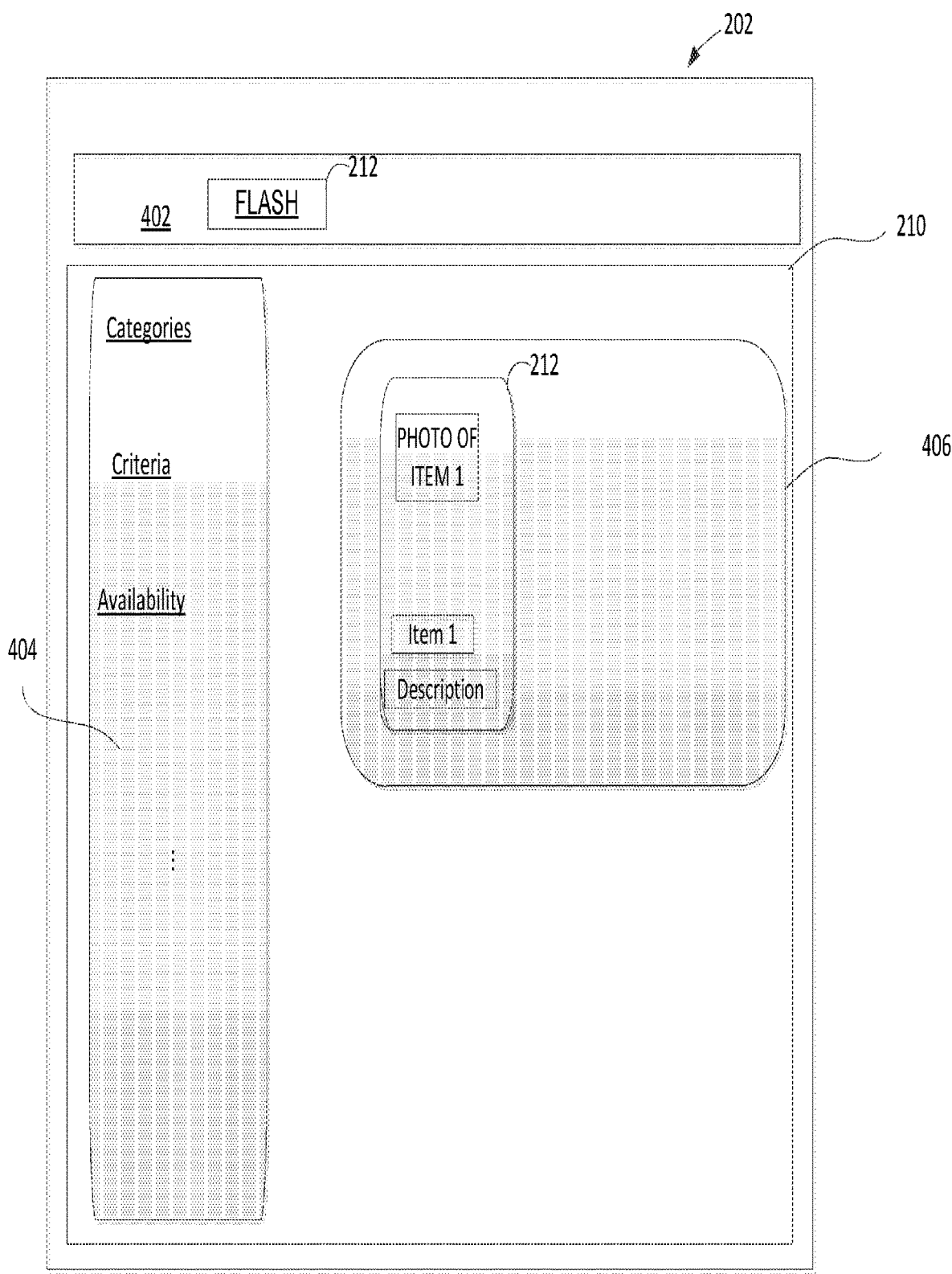
FIGS. 4-9 illustrate diagrams showing graphical user interfaces as a result of the browser extension implementation according to one embodiment of the invention.

Still referring to FIG. 4, upon selecting the Flash by the user, the Flash may trigger the browser drive or execute GUI elements on the browser. For example, after the user is logged with the Flash and selects the Flash using a pointing device, such as a mouse or a touch gesture, a graphical element 404 may be displayed showing one or more ways to organize products available for purchase. For example, the graphical element 404 may first organize the products by categories, (buying) criteria, availability, popularity, etc., It is to be understood that other classification of products may be used without departing from the scope and spirit of embodiments of the invention.

Similarly, a separate graphical element 406 may be triggered if the user selects one of the categories. For example, the graphical element 406 may be a window or panel that shows details 212 of a product, such as a photo of the item, the name of the item, a description of the item, etc.

Figure 5:
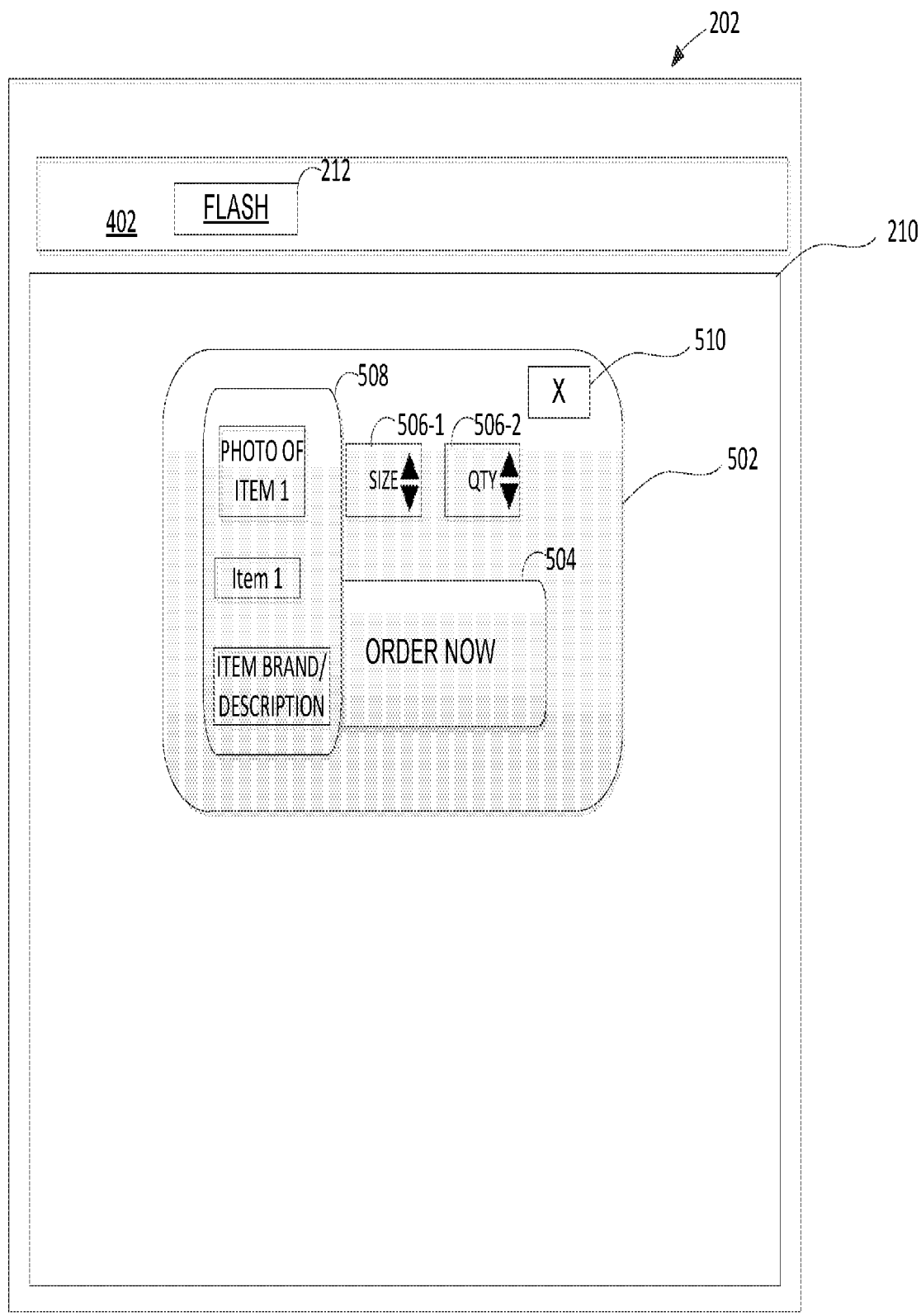
Figure 6:
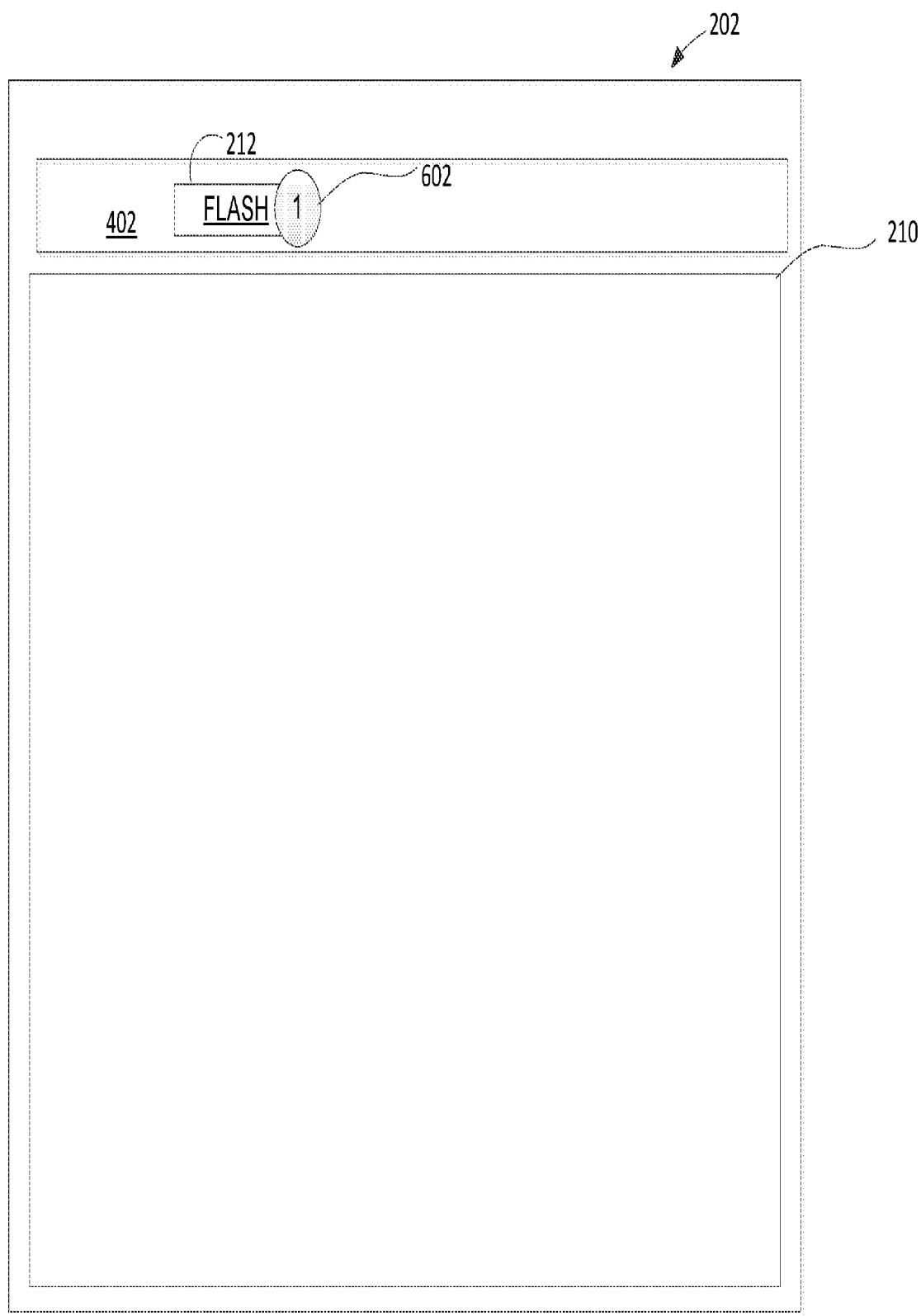

Referring now to FIG. 5, an alternative graphical element 502 may be displayed in response to the user selecting one of the item. In this example, the graphical element 502 also shows some details of the product/item in pane or section 508. In addition, sections 506 may include some buying criteria. Moreover, the graphical element 502 includes an button "ORDER NOW" 504. This button, upon selection, may trigger the Flash to initiate a checkout process. On the other hand, if the user selects a button 510, the graphical element 502 may disappear, see FIG. 6, but the viewed item in 508 may still be part of the history that the Flash stores in the client device as well as the virtual wallet account of the user. For example, the Flash may keep the recently viewed item under a heading of "Recently viewed" or other similar title. In another embodiment, the Flash may automatically add a notification icon 602 to the Flash to remind the user. For example, the icon 602 may dynamically change the number depending on the number of "Recently viewed" items are there associated with the user. It is to be understood that the notification numbers may be configured in a setting of the Flash or with the virtual wallet account of the user without departing from the scope or spirit of the invention. In another embodiment, the Flash button may visually provide visual cues such as flashing the button on the toolbar 402. In one example, the flashing visual cues may also indicate timing of the purchase or when to buy.

In the non-visual implementation, the Flash may provide audio reminders periodically or in response to a related skill being triggered. For example, the Flash may provide functionalities to monitor parameters of other related skills. In one instance, suppose the user issues the following command: "Device, search for the NBA ticket on Jan. 27, 2017." In this example, the "search for" or "search" command may be a "skill" for the non-visual user interactive device and "the NBA ticket on Jan. 27, 2017" may be parameters for the "skill." Upon detecting related the "skill," the Flash may audibly reminder the user that they are "Recently viewed" items in the Flash or virtual wallet account that is related to the items for the related "skill."

Figure 7:
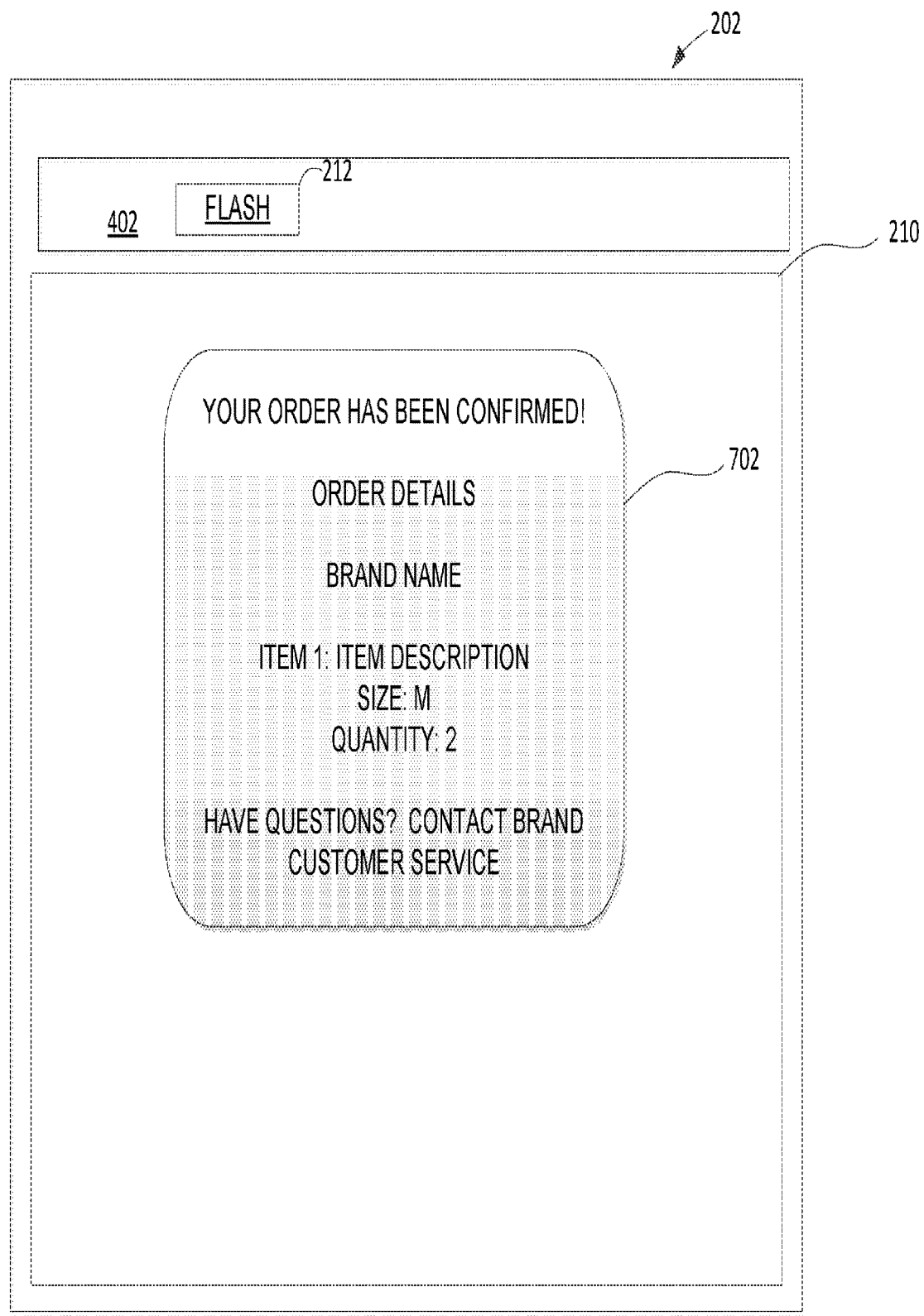

Referring now to FIG. 7, suppose that the user, instead of selecting the button 602, selects button 504 after also satisfying other buying criteria for the item (such as size and quantity, as an example), the Flash provides a graphical element 702 as a confirmation that the item has been purchased. For example, as described above, on the back-end, the merchants have already provided the detailed information of any given item/product to the payment processor and that, via the Flash, the user is logged into the virtual wallet account associated with the payment processor. As such, upon activating the ORDER NOW button 504, the Flash triggers sending a checkout payload to start the checkout process. In one example, the checkout payload includes all information related to the ordered item that the merchant needs to process the order as well as a client-side token or tokenized authentication from the payment processor to the user via the virtual wallet account. In other words, instead of the typical purchasing experience of the user visiting the merchant and having the merchant takes payment information to complete the checkout process, embodiments of the invention provide a secure channel from the payment processor to the Flash implemented checkout process. The secured, one-time payment token or tokenized authentication is issued or generated from the payment processor for the user. This payment token may be further included in the payment payload to be forwarded to the merchant such that it may then presented for payment from the issuer where the payment vehicle of the user is issued.

Figure 8:
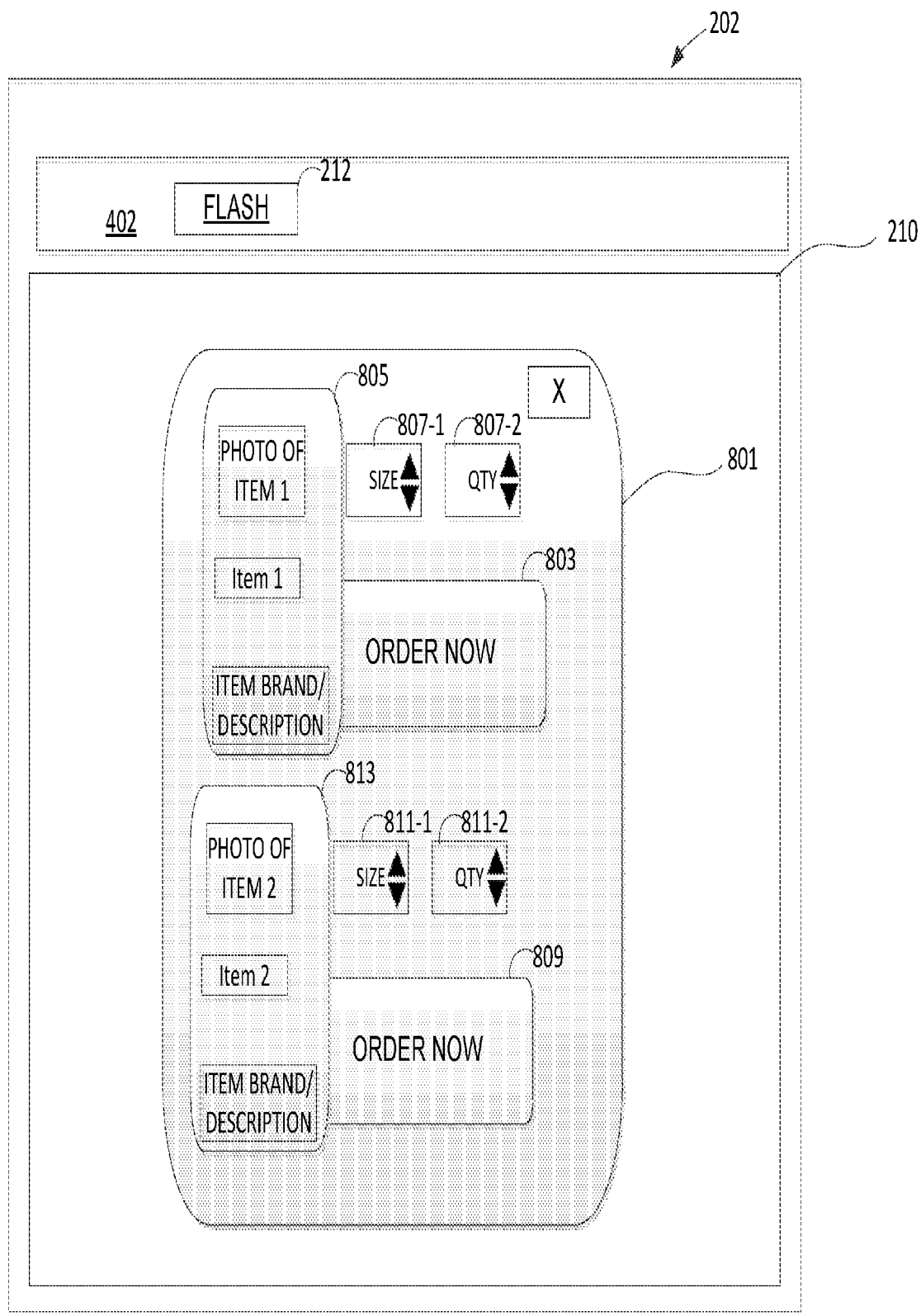

In another embodiment, FIG. 8 illustrates another embodiment of the Flash where the user may see more than one items are organized in a graphical element 801. The graphical element 801 may organize the different items 805 and 813 with different ORDER NOW buttons 803 and 809, respectively. In one embodiment, the order of the display may be based on priority preferences, configuration preferences, etc., that may be set by the user.

Figure 9:
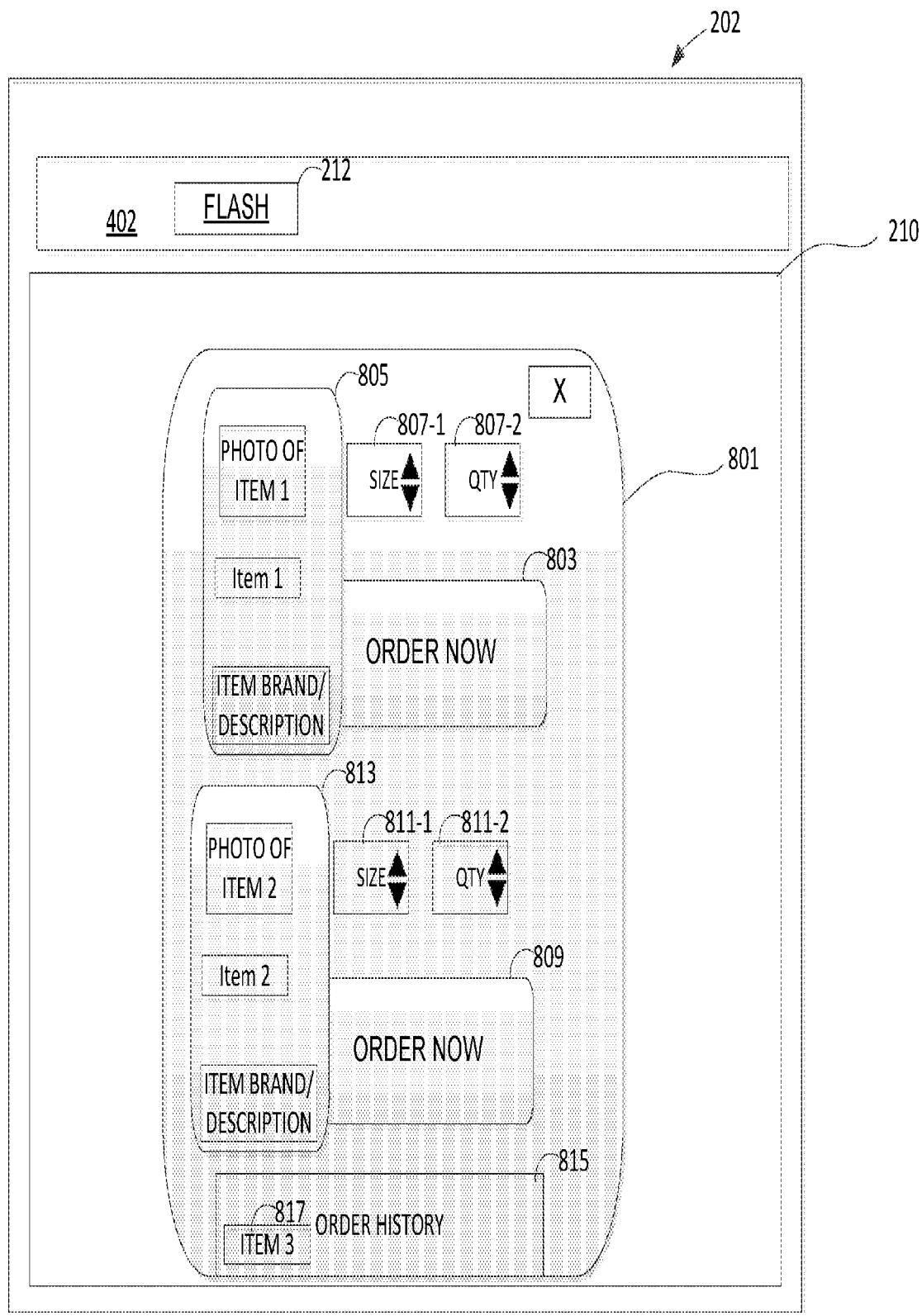

In another embodiment in FIG. 9, a graphical element 815 may show order history of items, such as item 817 of the user.

In another embodiment, the Flash may enable convenient and no-hassle reorder of frequently purchased items. For example, because Flash is product-based and not merchant-based implementation on the client device of the user, the Flash may enable to-do or to-buy list without the need to specifically selects an item to reorder. While some reorder items have time tendencies or frequencies that are easy to predict, some may not be. As such, some automatic suggested reordering subscriptions may be annoyed based on some of the existing implementations.

In another embodiment, the Flash may enable bill payment features or aggregated bill payment features where a number of bills that are due close in time may be presented to the user for payment. It is to be understood that some of the bills may be discovered by the virtual wallet account where the user has used some of the payment vehicles to pay in the past, e.g., past payments.

Moreover, if one the items shown by the Flash is not available from a merchant where the user previously purchased from, the Flash may substitute the merchant while updating the price if the pricing is different. This is a drastic departure of some of the mega-store's implementation because in that implement, there is only one preferred merchant. While there may a third party seller, the third party seller is usually placed in a secondary position.

The Flash is neutral to the merchant; it allows the user to configure how the priority is displayed. Hence, it provides a merchant-neutral shopping experience and is capable to invoke payment task in one-action (e.g., selecting the Flash button) or ask for the Flash skill in a non-visual implementation.

Merchant initializes and renders Visa Flash icon against relevant products. (using v.init for Flash).

Merchant shares SKU number, Maximum quantities available, Buying Criteria (Size/Width/Length/Age/Color/etc.).

When user clicks on the Visa Flash icon, Visa Checkout intimates merchant through a Visa Checkout/Flash payload. (using Payload for Flash).

Merchant initializes and renders Visa Flash icon against relevant products. (using v.init for Flash).

Merchant shares SKU number, Maximum quantities available, Buying Criteria (Size/Width/Length/Age/Color/etc.).

When user clicks on the Visa Flash icon, Visa Checkout intimates merchant through a Visa Checkout/Flash payload. (using Payload for Flash)

Figure 12:
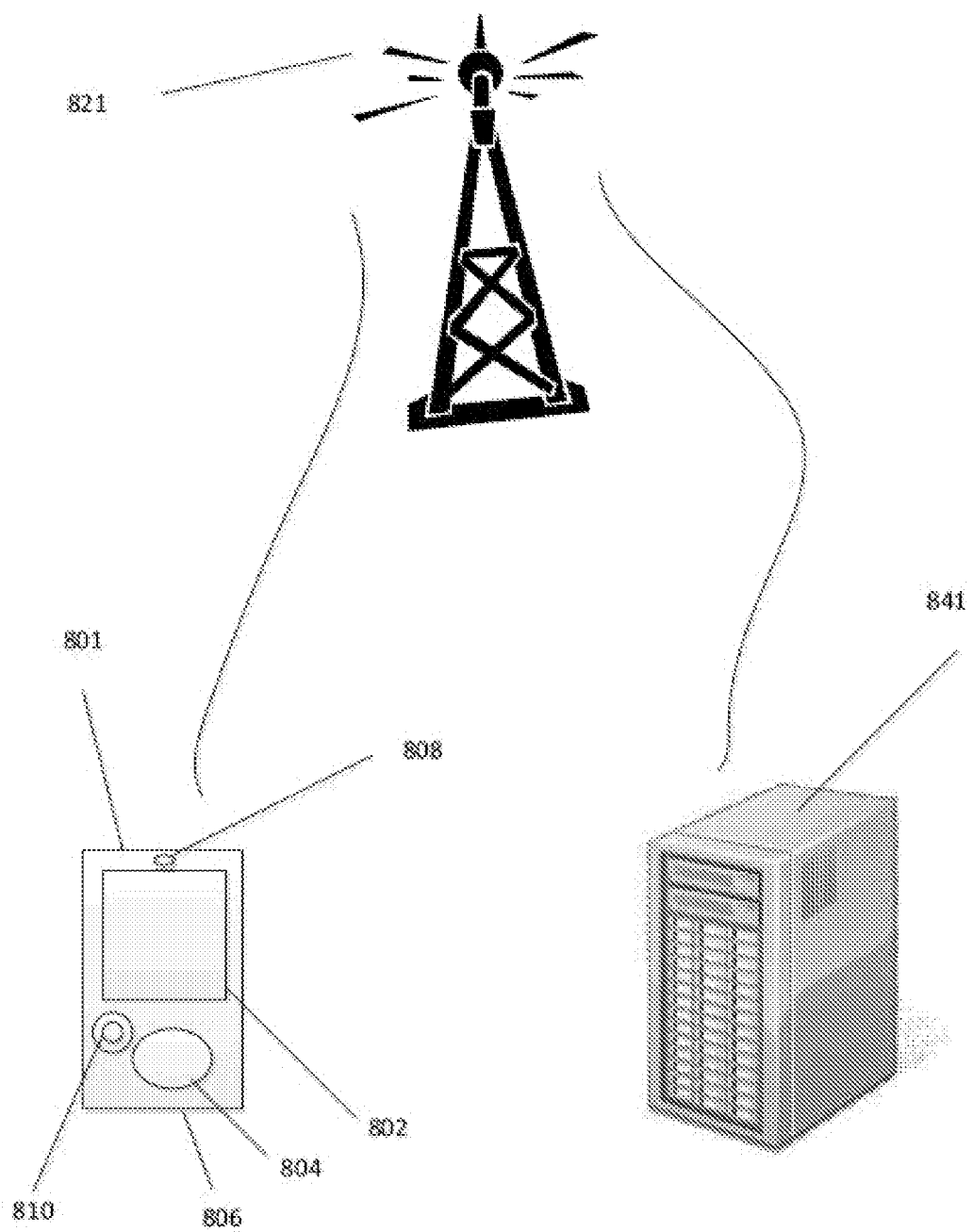
FIG. 12 illustrates a diagram of a high level illustration of a portable computing device according to one embodiment of the invention.

FIG. 12 may be a high level illustration of a portable computing device 800 communicating with a remote computing device 1441 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 800 may be a mobile device 112 that operates using a portable power source 855 such as a battery. The portable computing device 800 may also have a display 802 which may or may not be a touch sensitive display. More specifically, the display 802 may have a capacitance sensor, for example, that may be used to provide input data to the portable computing device 800. In other embodiments, an input pad 804 such as arrows, scroll wheels, keyboards, etc., may be used to provide inputs to the portable computing device 800. In addition, the portable computing device 800 may have a microphone 806 which may accept and store verbal data, a camera 808 to accept images and a speaker 810 to communicate sounds.

Figure 13:
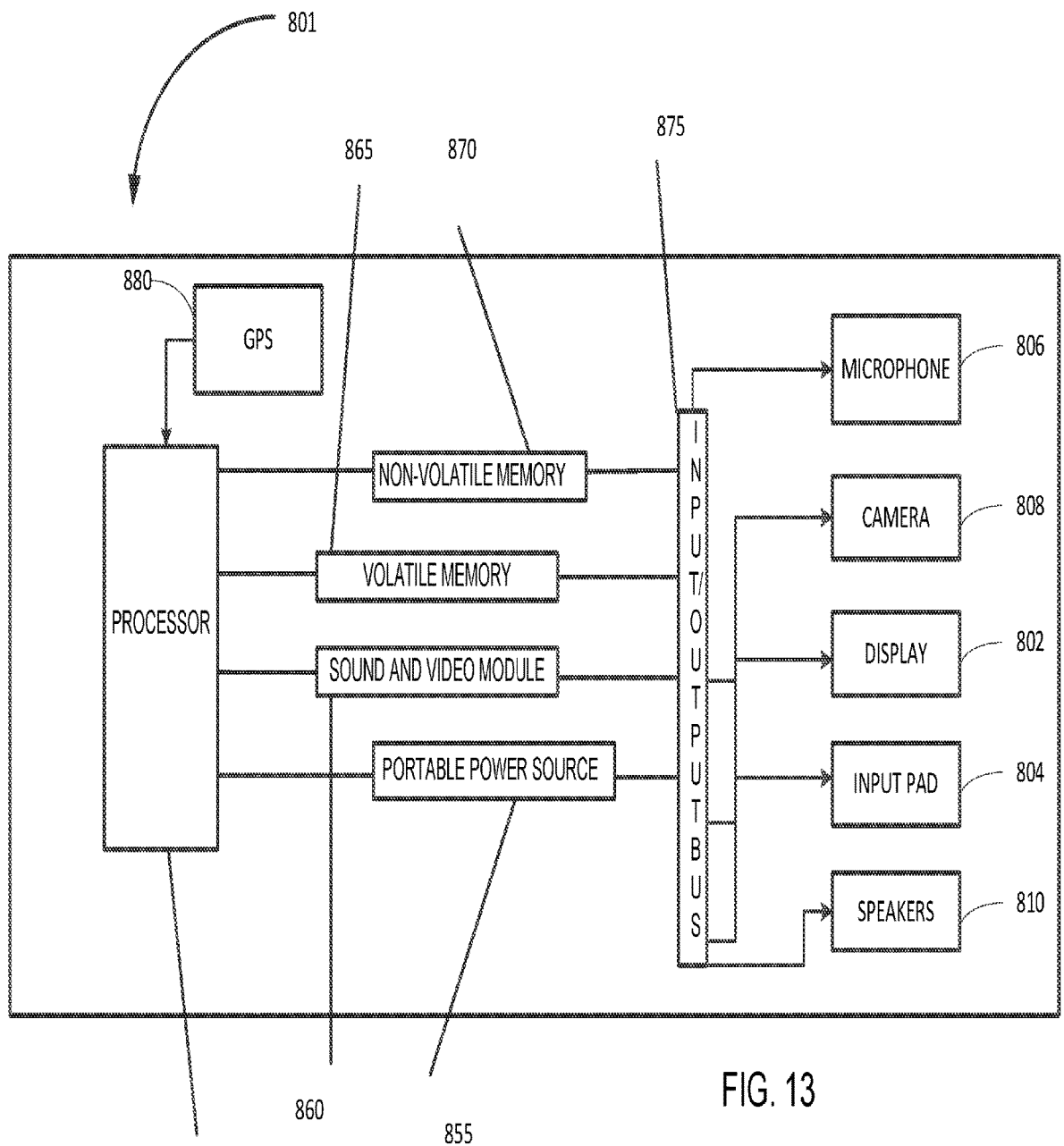
FIG. 13 illustrates a diagram of an exemplary user computing device according to one embodiment of the invention.

The portable computing device 800 may be able to communicate with a computing device 1441 or a plurality of computing devices 1441 that make up a cloud of computing devices 811. The portable computing device 800 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 1441 or may be through a communication network 102 such as cellular service, through the Internet, through a private network, through Bluetooth, etc. FIG. 13 may be a simplified illustration of the physical elements that make up a portable computing device 800 and FIG. 14 may be a simplified illustration of the physical elements that make up a server type computing device 1441.

FIG. 13 may be a sample portable computing device 800 that is physically configured according to be part of the system. The portable computing device 800 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 800 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 800 and the number and types of portable computing devices 800 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

Figure 14:
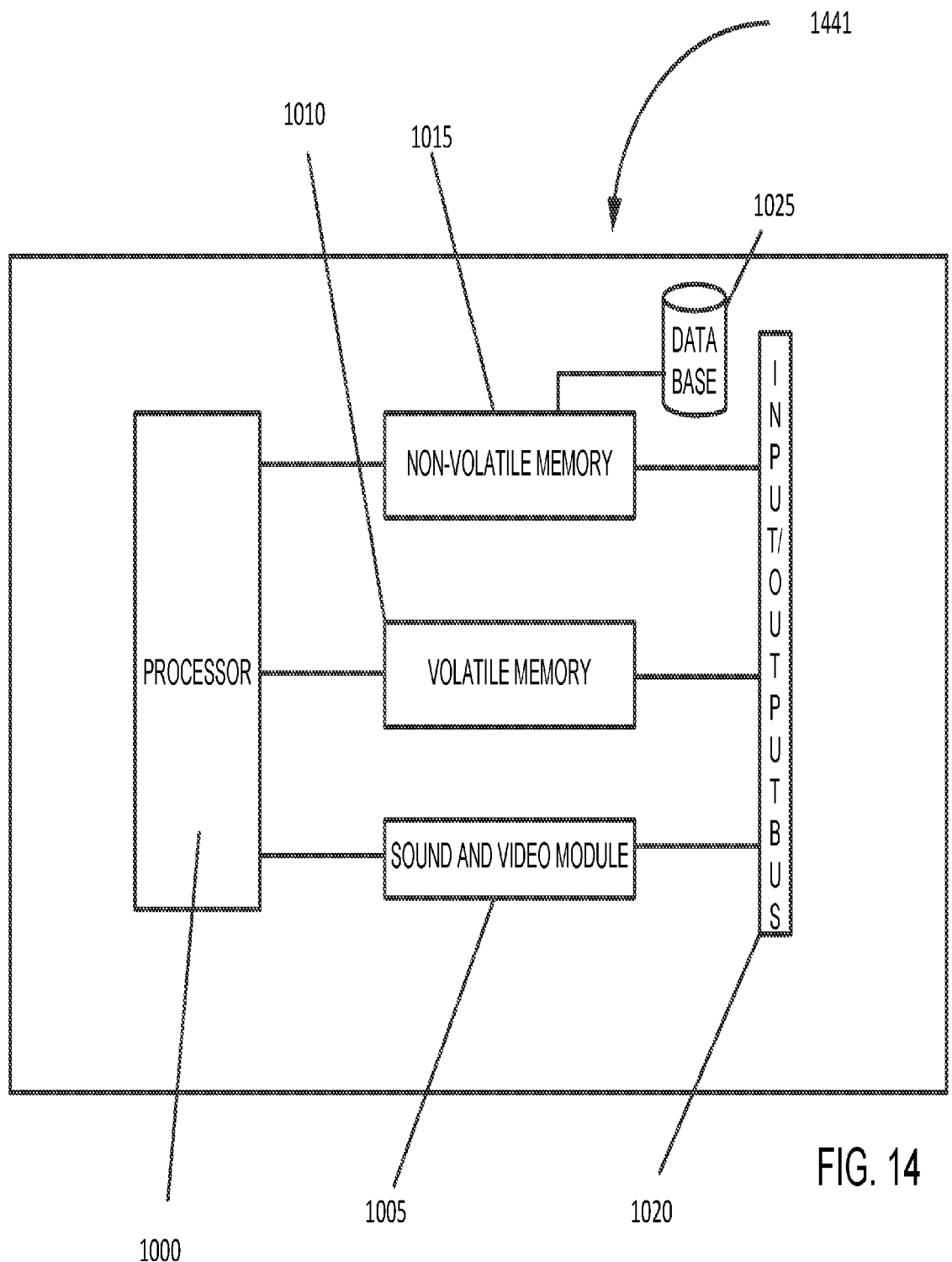
FIG. 14 illustrates an exemplary server computing system according to one embodiment of the invention.

The physical elements that make up the remote computing device 1441 may be further illustrated in FIG. 14. At a high level, the computing device 1441 may include a digital storage such as a magnetic disk, an optical disk, flash storage, non-volatile storage, etc. Structured data may be stored in the digital storage such as in a database. The server 1441 may have a processor 1000 that is physically configured according to computer executable instructions. It may also have a sound and video module 1005 which assists in displaying video and sound and may turn off when not in use to conserve power and battery life. The server 1441 may also have volatile memory 1010 and non-volatile memory 1015.

The database 1025 may be stored in the memory 1010 or 1015 or may be separate. The database 1025 may also be part of a cloud of computing device 1441 and may be stored in a distributed manner across a plurality of computing devices 1441. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 800 and in other embodiments, the application may be remote 1441. Of course, this is just one embodiment of the server 1441 and the number and types of portable computing devices 1441 is limited only by the imagination.

The claimed system and method may address several technical problems and challenges, some of which are described. Currently, entering potential sensitive data across networks makes users nervous to the point that a sale may be lost or money or time saving tips or coupons may not be received. By using a proprietary network such as a payment network, to transfer potentially sensitive data, security may be higher and users may be more open to joining additional beneficial programs. Similarly, moving data from one payment system to another loyalty system has felt risky to some users, but by using a proprietary, trusted network, the data may be communicated in a more trustworthy fashion. In addition, formatting data and communicating data in a manner which may be understood by a variety of additional programs is a technical challenge or problem which the system and method has addressed.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving data payload execution systems. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computer-implemented method comprising:
   loading a set of executable codes to a client device prior to an execution of an instance of a browser application on the client device;
   invoking, by the set of executable codes, functionalities in the browser application installed on the client device for interactions with the user, the invoked functionalities comprises displaying a graphical button disposed on a toolbar of the browser application;
   during the execution of the instance of the browser application, providing, by the set of executable codes, login prompts in a plurality of panels of the browser application to the user for logging into a virtual wallet account hosted by a server;
   during the execution of the instance of the browser application, providing a list of products for purchase from merchants in the plurality of panels in response to a successful login to the virtual wallet account by the user;
   during the execution of the instance of the browser application and in response to a selection of the graphical button, providing a graphical element in the plurality of panels for purchasing, by the user, at least one provided product from one of the merchants;
   during the execution of the instance of the browser application, in response to receiving a selection of the provided graphical element, triggering a request for a payment token to the server;
   generating the payment token by the server in response to the request and associating the payment token with the virtual wallet account for payment to be embedded as a payment payload, said received selection including confirming detailed information of the purchase;
   during the execution of the instance of the browser application, receiving the generated payment token;
   during the execution of the instance of the browser application, embedding the generated payment token and the detailed information of the purchase in the payment payload; and
   during the execution of the instance of the browser application, transmitting the payment payload to the one of the merchants to complete the purchase.

2. The computer-implemented method of claim 1, wherein providing the graphical element comprises providing the graphical element based on one or more existing graphical elements of the browser application.

3. The computer-implemented method of claim 1, further comprising executing, by the client device, the browser extension program within an execution environment of the browser application.

4. The computer-implemented method of claim 1, further comprising executing, by the client device, the browser extension program within an execution environment of an operating system of the client device.

5. The computer-implemented method of claim 1, further comprising providing another graphical user interface (GUI) element for displaying details of one of the list of products for purchase from the merchants in response to a selection from the user.

6. The computer-implemented method of claim 1, further comprising storing, by the client device, in a memory of the client device a list of recently viewed products from the list of products.

7. The computer-implemented method of claim 1, further comprising displaying a list of a single product offered from the merchants.

8. A system comprising:
a client computing device: wherein the computing device comprises a processor and a memory; wherein the memory comprises a browser application environment; wherein the client computing device is configured to execute:
installing a set of executable codes to the client computing device prior to an execution of an instance of a browser application;
invoking, by the set of executable codes, functionalities in the browser application installed on the client device for interactions with the user, the invoked functionalities comprises displaying a graphical button disposed on a toolbar of the browser application;
during the execution of the instance of the browser application, providing, by the set of executable codes, login prompts in a plurality of panels of the browser application to the user for logging into a virtual wallet account hosted by a server;
during the execution of the instance of the browser application, defining a graphical user interface (GUI) in the plurality of panels in the browser application for displaying a list of products for purchase from merchants in response to a successful login to the virtual wallet account by the user;
during the execution of the instance of the browser application and in response to a selection of the graphical button, defining a graphical element in the GUI in the plurality of panels in the browser application for directly purchasing, by the user, at least one provided product displayed in the GUI from one of the merchants;
during the execution of the instance of the browser application, in response to receiving a selection of the provided graphical element, triggering a request for a payment token to the server;
wherein the payment token is generated by the server in response to the request and associating the payment token with the virtual wallet account for payment to be embedded as a payment payload, said received selection including confirming detailed information of the purchase;
during the execution of the instance of the browser application, receiving the generated payment token;
during the execution of the instance of the browser application, embedding the generated payment token and the detailed information of the purchase in the payment payload; and
during the execution of the instance of the browser application, transmitting the payment payload to the one of the merchants to complete the purchase.

9. The system of claim 8, wherein defining the graphical element comprises providing the graphical element based on one or more existing graphical elements of the browser application.

10. The system of claim 8, further comprising displaying a list of a single product offered from the merchants.

11. The system of claim 8, further comprising executing, by the client computing device, the browser extension within an execution environment of an operating system of the client computing device.

12. The system of claim 8, further comprising providing another GUI element for displaying details of one of the list of products for purchase from merchants in response to a selection from the user.

13. The system of claim 8, further comprising storing, by the client device, in a memory of the client device a list of recently viewed products from the list of products.

14. A tangible non-transitory computer-readable medium having stored thereon computer-executable instructions executable by a processor of a client computing device, wherein the computer-executable instructions comprising:
loading a set of executable codes from a server to the client computing device prior to the execution of an instance of a browser application installed on the client computing device;
during the execution of the instance of the browser application, invoking, by the set of executable codes, functionalities in the client computing device for interactions with the user, the invoked functionalities comprises displaying a graphical button disposed on a toolbar of the browser application;
during the execution of the instance of the browser application, providing, by the set of executable codes, login prompts to the user for logging into a virtual wallet account hosted by the server;
during the execution of the instance of the browser application, after a successful login to the virtual wallet account by the user, actively sensing an audio trigger command and parameters associated with the trigger command;
during the execution of the instance of the browser application, upon the audio trigger command being sensed, announcing audibly a list of products for purchase from merchants;
during the execution of the instance of the browser application, actively sensing an audio identification of at least one of the list of products for purchase from one of the merchants;
during the execution of the instance of the browser application, in response to the audio identification being sensed, triggering a request for a payment token from the server;
wherein the payment token is generated by the server in response to the request and associating the payment token with the virtual wallet account for payment to be embedded as a payment payload, said audio identification including confirming detailed information of the purchase;
during the execution of the instance of the browser application, receiving generated payment token;
during the execution of the instance of the browser application, embedding the generated payment token and the detailed information of the purchase in the payment payload; and
during the execution of the instance of the browser application, transmitting the payment payload to the one of the merchants to complete the purchase.

15. The tangible non-transitory computer-readable medium of claim 14, further comprising announcing audibly a list of a single product offered from the merchants.

16. The tangible non-transitory computer-readable medium of claim 14, further comprising actively sensing a related audio trigger command and parameters associated with the audio trigger command.

17. The tangible non-transitory computer-readable medium of claim 16, further comprising audibly reminding the user about the related audio trigger command and parameters in a separate list.

18. The tangible non-transitory computer-readable medium of claim 14, further comprising executing, by the client computing device, a direct payment token generation program within an execution environment of an operating system of the client computing device.

19. The tangible non-transitory computer-readable medium of claim 14, further comprising providing another GUI element for displaying details of one of the list of products for purchase from merchants in response to a selection from the user.

20. The tangible non-transitory computer-readable medium of claim 14, further comprising storing, by the client device, in a memory of the client device a list of recently viewed products from the list of products.

* * * * *